(12) United States Patent
Huang

(10) Patent No.: US 7,195,568 B2
(45) Date of Patent: *Mar. 27, 2007

(54) GOLF CLUB HANDLE GRIP

(76) Inventor: Ben Huang, 19472 Woodlands La., Huntington Beach, CA (US) 92648

( * ) Notice: Subject to any disclaimer, the term of this patent is extended or adjusted under 35 U.S.C. 154(b) by 0 days.

This patent is subject to a terminal disclaimer.

(21) Appl. No.: 10/827,095

(22) Filed: Apr. 19, 2004

(65) Prior Publication Data

US 2004/0259662 A1 Dec. 23, 2004

Related U.S. Application Data

(63) Continuation of application No. 10/348,389, filed on Jan. 21, 2003, now Pat. No. 6,733,401.

(51) Int. Cl.
*A63B 53/14* (2006.01)

(52) U.S. Cl. .................................. 473/301

(58) Field of Classification Search ........ 473/300–303, 473/549, 568; D21/756; 74/551; 81/489; 16/421, 430; 280/821
See application file for complete search history.

(56) References Cited

U.S. PATENT DOCUMENTS

| | | | |
|---|---|---|---|
| 571,025 A | 11/1896 | Spamer | |
| 979,266 A | 12/1910 | Dean | |
| 1,008,604 A | 11/1911 | Lake | |
| 1,017,565 A | 2/1912 | Lard | |
| 1,139,843 A | 5/1915 | Brown | |
| 1,345,505 A | 7/1920 | Persons | |
| 1,435,088 A * | 11/1922 | Smith | 473/302 |
| 1,522,635 A | 1/1925 | Kraeuter | |
| 1,528,190 A | 3/1925 | Howe | |
| 1,617,972 A | 2/1927 | Wallace | |
| 1,890,037 A | 12/1932 | Johnson | |
| 1,943,399 A | 1/1934 | Smith | |
| 2,000,295 A | 5/1935 | Oldham | |
| 2,086,062 A | 7/1937 | Bray | |
| 2,103,889 A | 12/1937 | Brisick | |
| 2,149,911 A | 3/1939 | East | |
| 2,221,421 A | 11/1940 | Curry | |
| 2,225,839 A | 12/1940 | Moore | |
| 2,449,575 A | 9/1948 | Wilhelm | |
| 2,523,637 A | 9/1950 | Stanfield et al. | |

(Continued)

FOREIGN PATENT DOCUMENTS

CN 2163667 Y 5/1994

(Continued)

OTHER PUBLICATIONS

Defendants' Answer to Plaintiffs' Complaint for Infringement of U.S. Patent No. 5,797,813—Demand for Jury Trial, Filed Oct. 2, 2000, Civil Action No. SACV 00-882 GLT (ANX).

(Continued)

*Primary Examiner*—Stephen Blau
(74) *Attorney, Agent, or Firm*—Knobbe Martens Olson & Bear LLP

(57) ABSTRACT

A golf club handle grip having a smooth exterior surface such as utilized in a conventional rubber golf club grip, but with such grip being tacky and shock absorbing as compared to a conventional rubber golf club grip.

7 Claims, 8 Drawing Sheets

U.S. PATENT DOCUMENTS

| | | | |
|---|---|---|---|
| 2,671,660 A | | 3/1954 | Goodwin |
| 2,690,338 A | | 9/1954 | Brocke |
| 2,772,090 A | | 11/1956 | Brandon |
| 2,984,486 A | | 5/1961 | Jones |
| 3,087,729 A | * | 4/1963 | Sullivan ................ 473/301 |
| 3,095,198 A | | 6/1963 | Gasche |
| 3,157,723 A | | 11/1964 | Hochberg |
| 3,311,375 A | | 3/1967 | Onions |
| 3,366,384 A | | 1/1968 | Lamkin et al. |
| 3,606,325 A | | 9/1971 | Lamkin et al. |
| 4,015,851 A | * | 4/1977 | Pennell ................ 473/549 |
| 4,052,061 A | | 10/1977 | Stewart |
| 4,133,529 A | | 1/1979 | Gambino |
| 4,137,360 A | | 1/1979 | Reischl |
| 4,347,280 A | | 8/1982 | Lau et al. |
| 4,358,499 A | | 11/1982 | Hill |
| 4,448,922 A | | 5/1984 | McCartney |
| 4,651,991 A | | 3/1987 | McDuff |
| 4,662,415 A | | 5/1987 | Proutt |
| 4,765,856 A | | 8/1988 | Doubt |
| 4,878,667 A | | 11/1989 | Tosti |
| 4,941,232 A | | 7/1990 | Decker et al. |
| 5,055,340 A | | 10/1991 | Matsumura et al. |
| 5,118,107 A | | 6/1992 | Bucher |
| 5,123,646 A | | 6/1992 | Overby et al. |
| 5,127,650 A | | 7/1992 | Schneller |
| 5,469,601 A | | 11/1995 | Jackson |
| 5,511,445 A | | 4/1996 | Hildebrandt |
| 5,570,884 A | | 11/1996 | Carps |
| 5,571,050 A | | 11/1996 | Huang |
| 5,577,722 A | | 11/1996 | Glassberg |
| 5,584,482 A | | 12/1996 | Huang |
| 5,611,533 A | | 3/1997 | Williams |
| 5,624,116 A | | 4/1997 | Yeh |
| 5,626,527 A | | 5/1997 | Eberlein |
| 5,645,501 A | | 7/1997 | Huang |
| 5,671,923 A | | 9/1997 | Huang |
| 5,695,418 A | | 12/1997 | Huang |
| 5,730,669 A | | 3/1998 | Huang |
| 5,772,524 A | | 6/1998 | Huang |
| 5,781,963 A | | 7/1998 | Maru et al. |
| 5,797,813 A | | 8/1998 | Huang |
| 5,813,921 A | | 9/1998 | Huang |
| 5,816,933 A | | 10/1998 | Huang |
| 5,839,983 A | | 11/1998 | Kramer |
| 5,851,632 A | | 12/1998 | Chen et al. |
| 5,857,929 A | | 1/1999 | Huang |
| 5,867,868 A | | 2/1999 | Ward |
| 5,890,260 A | | 4/1999 | Gaunt |
| 5,890,972 A | | 4/1999 | Huang |
| 5,895,329 A | | 4/1999 | Huang |
| 5,924,941 A | | 7/1999 | Hagey |
| 5,925,941 A | | 7/1999 | Kofink |
| 6,036,607 A | | 3/2000 | Finegan |
| 6,197,392 B1 | | 3/2001 | Jones |
| 6,226,836 B1 | | 5/2001 | Yasui |
| 6,244,975 B1 | | 6/2001 | Huang |
| 6,361,450 B1 | | 3/2002 | Huang |
| 6,386,989 B1 | | 5/2002 | Huang |
| 6,449,803 B1 | | 9/2002 | McConchie |
| 6,503,153 B2 | | 1/2003 | Wang |
| 6,506,128 B1 | | 1/2003 | Bloom, Jr. |
| 6,551,198 B2 | | 4/2003 | Huang |
| 6,558,270 B2 | | 5/2003 | Kwitek |
| 6,627,027 B2 | | 9/2003 | Huang |
| 6,629,901 B2 | | 10/2003 | Huang |
| 6,652,398 B2 | | 11/2003 | Falone et al. |
| 6,656,057 B2 | | 12/2003 | Manual et al. |
| 6,663,500 B2 | | 12/2003 | Huang |
| 6,666,777 B1 | | 12/2003 | Lamkin et al. |
| 6,676,534 B2 | | 1/2004 | Huang |
| 6,709,346 B1 | | 3/2004 | Wang |
| 6,733,401 B1 | | 5/2004 | Huang |
| 6,843,732 B1 | | 1/2005 | Huang |
| 6,857,971 B2 | | 2/2005 | Huang |
| 2002/0142858 A1 | | 10/2002 | Chen |
| 2002/0142900 A1 | | 10/2002 | Wang |
| 2002/0173371 A1 | | 11/2002 | Lamkin et al. |
| 2003/0040384 A1 | | 2/2003 | Falone et al. |
| 2003/0045370 A1 | | 3/2003 | Jaw |
| 2003/0148836 A1 | | 8/2003 | Falone et al. |
| 2003/0150081 A1 | | 8/2003 | Wang |
| 2003/0216192 A1 | | 11/2003 | Chu |
| 2003/0228930 A1 | | 12/2003 | Huang |
| 2004/0029645 A1 | | 2/2004 | Chen |
| 2004/0031128 A1 | | 2/2004 | Chen |
| 2004/0185958 A1 | | 9/2004 | Huang |

FOREIGN PATENT DOCUMENTS

| | | |
|---|---|---|
| DE | 3644 674 A1 | 7/1988 |
| EP | 1 371 397 | 12/2003 |

OTHER PUBLICATIONS

Answer to Plaintiffs' First Amended Complaint and Counterclaim of Defendant Eaton Corporation and Demand for Jury Trial, Filed Aug. 28, 2002, Case No. SACV-02-626 GLT (ANx).

Complaint for Declaratory Judgment of Patent Invalidity and Noninfringement, Filed Mar. 25, 2004, Case No. 04-71117.

Answer to Complaint for Declaratory Judgment and Counterclaim for Patent Infringement—Demand for Jury Trial, Filed Apr. 29, 2004, Case. No. 04-71117.

Answer to Counterclaim, Filed May 10, 2004, Case No. 04-71117.

Affirmative Defenses to the Counterclaim, Filed May 10, 2004, Case No. 04-71117.

King Par Corporation's Answer to Second Amended Complaint for Patent Infringement, Filed Jan. 11, 2005, Case No. 04-71117.

Defendant Maibor Corporation's Answer and Affirmative Defenses to Plaintiff's Second Amended Complaint, Filed May 3, 2005, Case No. 04-71117.

Answer to Amended Complaint by Ming Hsing Leather Company, Limited, Filed May 9, 2005, Case No. 04-71117.

Defendants' Proposed Claim Construction Summary, Filed Aug. 2, 2005, Case No. 04-71117.

Plaintiffs' Submission of Revised Proposed Claim Construction, Filed Aug. 2, 2005, Case No. 04-71117.

Decision on Claim Construction, Filed Aug. 30, 2005, Case No. 04-71117.

Plaintiffs' Answer to Counterclaim of Defendant WINN Inc., Filed Sep. 7, 2004, Case No. C2-04-576.

Plaintiffs' Answer to Counterclaim of Ben Huang, Filed Oct. 6, 2004, Case No. C2-04-576.

Counterclaim-Defendant Jack Wang's Answer to Counterclaim of Defendant WINN, Inc. and Ben Huang, Filed Nov. 22, 2004, Case No. C2-04-576.

Stipulated Preliminary Injuction, Filed Mar. 14, 2005, Case No. SACV 05-168 CJC (RNBx).

Answer of Defendants Karakal Far East Ltd. and High Cedar Enterprises Co., Ltd., Filed Apr. 13, 2005, Case No. SACV 05-168 CJC (RNBx).

Initial Disclosures of Plaintiffs WINN Incorporated and Ben Huang, Filed May 9, 2005, Case No. SACV 05-168 CJC (RNBx).

Initial Disclosures of Defendants High Cedar Enterprises, Co. Ltd. and Karakal Far East Ltd., Filed May 9, 2005, Case No. SACV 05-168 CJC (RNBx).

European Search Report, European Application No. EP 04 25 7967, 4 pages—cites US 2004/185958; EP 1 371 397; US 2,225,839; US 6,666,777; US 5,839,983; US 5,577,722; and US 979,266.

Partial European Search Report, App. No. EP 03 25 5917, 2 pages—cites: 5,671,923; 4,765,856; US 2002/173371; US 2003/040384; and 5,571,050.

Pending U.S. Appl. No. 10/167,216, filed Jun. 11, 2002.

Pending U.S. Appl. No. 10/608,598, filed Jun. 27, 2003.

Pending U.S. Appl. No. 10/785,379, filed Feb. 24, 2004.

Pending U.S. Appl. No. 10/875,035, filed Jun. 23, 2004.
Pending U.S. Appl. No. 11/029,328, filed Jan. 5, 2005.
Pending U.S. Appl. No. 11/062,046, filed Feb. 18, 2005.
Pending U.S. Appl. No. 11/131,832, filed May 18, 2005.
Pending U.S. Appl. No. 11/172,770, filed Jul. 1, 2005.
Answers and Objections of Eaton Corporation to First Set of Interrogatories Filed Jan. 17, 2003, CV 03-1568.
Memorandum in Support of Defendant's Motion for Summary Judgment Filed Apr. 25, 2003, CV 03-1568.
Declaration of Nick G. Saros in Support of Defendant's Motion for Summary Judgment Filed Apr. 25, 2003, CV 03-1568.
Declaration of Luke L. Dauchot Filed Apr. 24, 2003, CV 03-1568.
Answers and Objections of Eaton Corporation to Interrogatories Filed May 2, 2003, CV 03-1568.
Application to File Confidential Declaration of Lynda J. Zadra-Symes in Support of Plaintiffs' Opposition to Defendant Eaton Corporation's Motion for Summary Judgment Under Seal Filed May 21, 2003, CV 03-1568.
Non-Confidential Declaration of Lynda J. Zadra-Symes in Support of Plaintiffs' Opposition to Defendant Eaton Corporation's Motion for Summary Judgment Filed May 21, 2003.
Appendix of Citations in Support of Plaintiffs' Opposition to Defendant Eaton Corporation's Motion for Summary Judgment Filed May 21, 2003, CV 03-1568.
Statement of Genuine Issues of Material Fact in Support of Plaintiffs' Opposition to Defendant Eaton Corporation's Motion for Summary Judgment Filed May 21, 2003, CV 03-1568.
Declaration of Ben Huang, Ph.D. in Support of Plaintiffs' Opposition to Defendant Eaton Corporation's Motion of Summary Judgment Filed May 21, 2003, CV 03-1568.
Declaration of Charles Alexander Garris, Ph.D. in Support of Plaintiff Winn Inc.'s Opposition to Defendant Eaton Corporations's Motion for Summary Judgment Filed May 21, 2003, CV 03-1568.
Plaintiffs' Opposition to Defendant Eaton Corporation's Motion for Summary Judgment Filed May 21, 2003, CV 03-1568.
Declaration of Nick G. Saros in Support of Defendant's Reply Brief in Support of its Motion for Summary Judgment Filed May 27, 2003, CV 03-1568.
Defendant's Reply Brief in Support of its Motion for Summary Judgment Filed May 27, 2003, CV 03-1568.
Amended Answers and Objections of Eaton Corporation to Interrogatories Filed May 29, 2003, CV 03-1568.
Supplemental Answers and Objections of Eaton Corporation to Interrogatory Nos. 6, 10, and 11 of the Interrogatories Filed Jun. 6, 2003, CV 03-1568.
Supplemental Answers and Objections of Eaton Corporation to Interrogatory Nos. 6 and 7 of the First Set of Interrogatories Filed Jun. 6, 2003, CV 03-1568.
Order Re: Motion for Summary Judgment Filed Jun. 16, 2003, CV 03-1568.
Answers and Objections of Eaton Corporation to Ben Huang's Second Set of Interrogatories Filed Jun. 16, 2003, CV 03-1568.
Declaration of Jeffrey Lloyd Shepherd in Support of Plaintiffs' Motion for Summary Judgment Dismissing Defendant's Counterclaims Filed Aug. 4, 2003, CV 03-1568.
Application to File Confidential Declaration of Paul A. Stewart in Support of Plaintiffs' Motion for Summary Judgment Under Seal Filed Aug. 4, 2003, CV 03-1568.
Non-Confidential Declaration of Paul A. Stewart in Support of Plaintiffs' Motion for Summary Judgment Dismissing Defendant's Counterclaims Filed Aug. 4, 2003, CV 03-1568.
Declaration of Nick G. Saros in Support of Eaton's Motion for Summary Judgment Filed Aug. 4, 2003, CV 03-1568.
Second Supplemental Answer and Objections of Eaton Corporation to Interrogatory No. 6. of the Interrogatories Filed Aug. 6, 2003, CV 03-1568.
Supplemental Answers and Objections of Eaton Corporation to Interrogatory Nos. 5-7 and 9 of the First Set of Interrogatories Filed Aug. 6, 2003, CV 03-1568.
Supplemental Declaration of Nick G. Saros in Support of Eaton's Motion for Summary Judgment Filed on Aug. 4, 2003 Filed Aug. 7, 2003, CV 03-1568.

Defendant Eaton Corporation's Opposition to Plaintiffs' Motion for Summary Judgement Filed Aug. 11, 2003, CV 03-1568.
Appendix of Citations in Support of Defendant's Opposition to Plaintiffs' Motion for Summary Judgment Filed Aug. 11, 2003, CV 03-1568.
Statement of Genuine Issues of Material Fact in Support of Eaton Corporation's Opposition to Plaintiffs' Motion for Summary Judgment Filed Aug. 11, 2003, CV 03-1568.
Non-Confidential Declaration of Nick G. Saros in Support of Defendant's Opposition to Plaintiffs' Motion for Summary Judgment Filed Aug. 11, 2003, CV 03-1568.
Plaintiffs' Opposition to Defendant's Motion for Summary Judgment Filed Aug. 11, 2003, CV 03-1568.
Statement of Genuine Issues of Material Fact in Opposition to Eaton Corporation's Motion for Summary Judgement Filed Aug. 11, 2005, CV 03-1568.
Declaration of Dr. Garth L. Wilkes in Support of Plaintiffs' Opposition to Eaton Corporation's Motion for Summary Judgment Filed Aug. 11, 2003, CV 03-1568.
Declaration of Dr. Kurt C. Frisch, Jr. in Support of Plaintiffs' Opposition to Eaton Corporation's Motion for Summary Judgment Aug. 11, 2003, CV 03-1568.
Eaton Corporation's Reply Brief in Support of its Second Motion for Summary Judgment Filed Aug. 18, 2005, CV 03-1568.
Declaration of Nick G. Saros in Support of Eaton's Reply Brief in Support of its Motion for Summary Judgment Filed Aug. 18, 2003, CV 03-1568.
Reply Brief in Support of Plaintiffs' Motion for Summary Judgment Dismissing Defendant's Counterclaims Filed Aug. 18, 2003, CV 03-1568.
Non-Confidential Supplemental Declaration of Paul A. Stewart in Support of Plaintiffs' Motion for Summary Judgment Dismissing Defendant's Counterclaims Filed Aug. 18, 2005,CV 03-1568.
Plaintiffs' Submission of Aug. 18, 2003 Transcript of Deposition of Dr. Shaw Ling Hsu in Opposition to Defendant's Motion for Summary Judgment Filed Aug. 20, 2003, CV 03-1568.
Defendant's Response to Plaintiffs' Submission of Aug. 18, 2003 Filed Aug. 21, 2003, CV 03-1568.
Declaration of Erica S. Olson in Support of Eaton's Response to Plaintiffs' Submission of Aug. 18, 2003 Filed Aug. 21, 2003, CV 03-1568.
Supplemental Declaration of Dr. Kurt C. Frisch, Jr. in Support of Plaintiffs' Opposition to Eaton Corporation's Motion for Summary Judgment Filed Aug. 25, 2005, CV 03-1568.
Plaintiffs' Memorandum of Contentions of Fact and Law Filed Sep. 8, 2003,CV 03-1568.
Stipulated Dismissal and Order Filed Oct. 9, 2003, CV 03-1568.
Answer to Winn Inc.'s First Set of Interrogatories (Nos. 1-5) Filed Jul. 20, 2004, CV 04-71117 (*Note Annex A to this Answer was marked Confidential. As such, the Annex has not been submitted herewith.).
Response of Winn Inc. and Ben Huang to Defendant King Par Corporation's First Set of Interrogatories Directed to Plaintiffs Filed Aug. 2, 2004, CV 04-71117.
Answer to Plaintiff's Fourth Set of Interrogatories to King Par Corporation (Nos. 10-12) Filed Dec. 30, 2004, CV 04-71117.
Plaintiffs' Claim Construction Brief Filed Mar. 2, 2005, CV 04-71117.
Declaration of Dr. Charles A. Garris in Support of Plaintiff's Claim Construction Filed Mar. 3, 2005, CV 04-71117.
Declaration of Dr. Kurt C. Frisch, Jr. in Support of Plaintiffs' Claim Construction Position Filed Mar. 3, 2005, CV 04-71117.
Declaration of Dr. Ben Huang in Support of Plaintiffs'Claim Construction Filed Mar. 3, 2005, CV 04-71117.
Winn, Inc. and Ben Huang's Appendix of Dictionary Citations Filed Mar. 3, 2005, CV 04-71117.
Memorial for the Respondent Filed Mar. 15, 2005, CV 04-71117.
Errata to Plaintiffs' Claim Construction Brief Filed Mar. 21, 2005, CV 04-71117.
Defendant's Brief on Claim Construction Filed Mar. 30, 2005, CV 04-71117.

Responses of High Cedar Enterprises Co., Ltd., Karakal Far East, Ltd., a/k/a Karakal Golf Grips and Jack Wang to Winn, Inc.'s First Set of Requests for Admission [Nos. 1-17] Filed Jun. 10, 2005, SACV 05-535 AHS (ANx).

Responses of High Cedar Enterprises Co., Ltd., Karakal Far East, Ltd., a/k/a Karakal Golf Grips and Jack Wang to Winn, Inc.'s First Set of Interrogatories [Nos. 1-15] Filed Jul. 11, 2005, SACV 05-535 AHS (ANx).

Memorandum of Points and Authorities in Support of Plaintiff's Motion for A Preliminary Injunction Filed Feb. 28, 2005, SACV 05-00168.

Declaration of Ben Huang in Support of Plaintiff's Motion for A Preliminary Injunction Filed Feb. 28, 2005, SACV 05-00168.

Declaration of Charles A. Garris in Support of Plaintiffs' Motion for Preliminary Injunction Filed Feb. 28, 2005, SACV 05-00168.

U.S. Appl. No. 11/412,196, filed Apr. 25, 2006.
U.S. Appl. No. 11/416,364, filed May 1, 2006.
U.S. Appl. No. 11/413,411, filed Apr. 28, 2006.
U.S. Appl. No. 11/438,808, filed May 22, 2006.
U.S. Appl. No. 11/417,643, filed May 3, 2006.
U.S. Appl. No. 11/417,696, filed May 3, 2006.
U.S. Appl. No. 11/417,623, filed May 3, 2006.
U.S. Appl. No. 11/417,555, filed May 3, 2006.
U.S. Appl. No. 11/417,401, filed May 3, 2006.
European Search Report (EP 06 25 0104) dated Oct. 24, 2006.

* cited by examiner

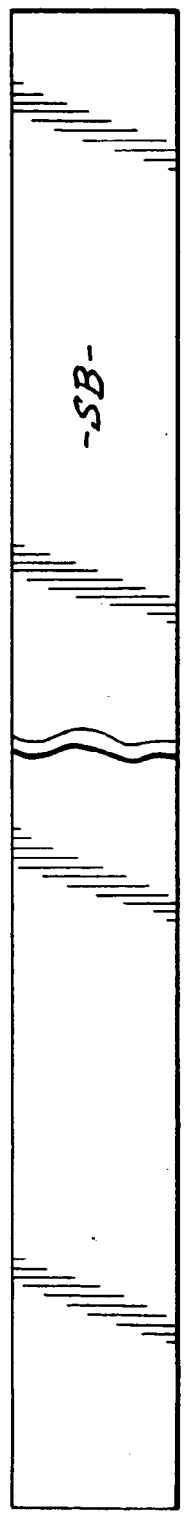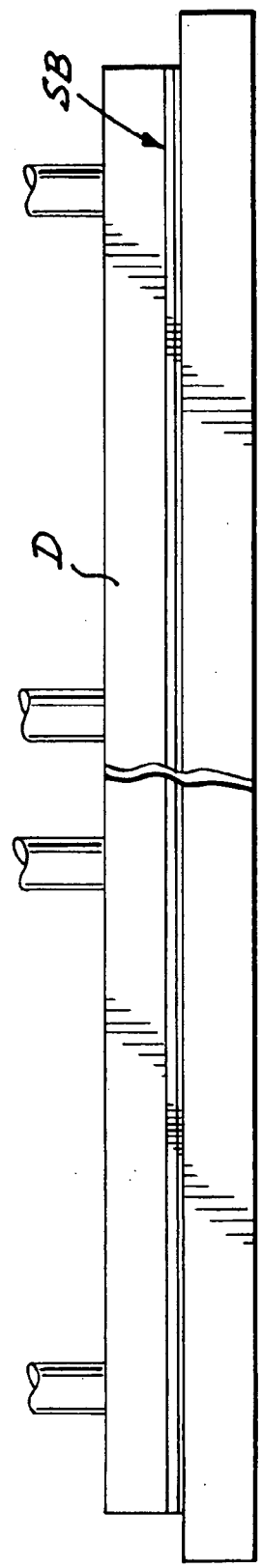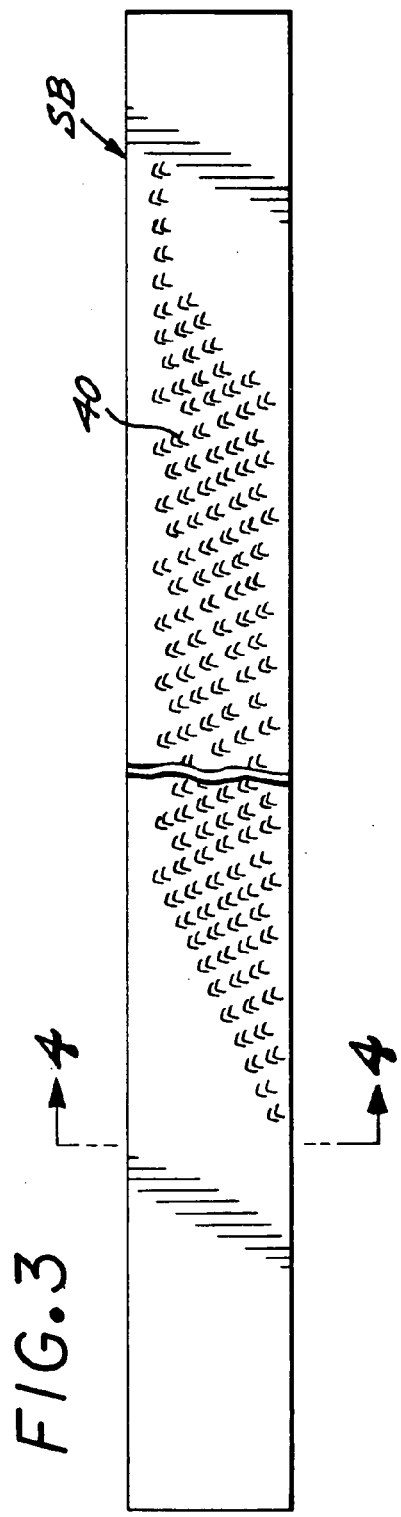

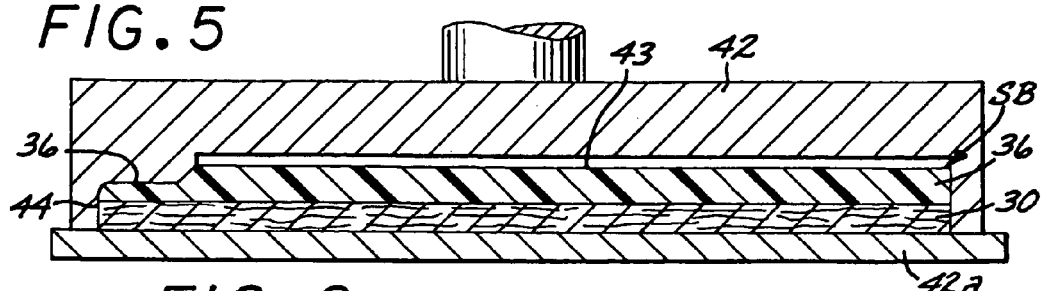
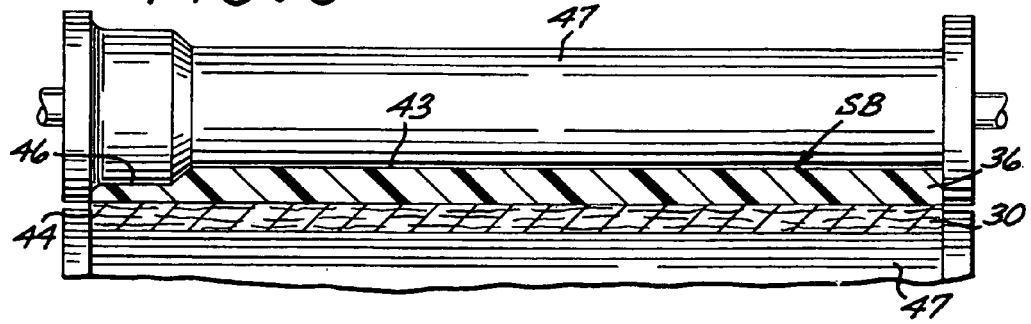
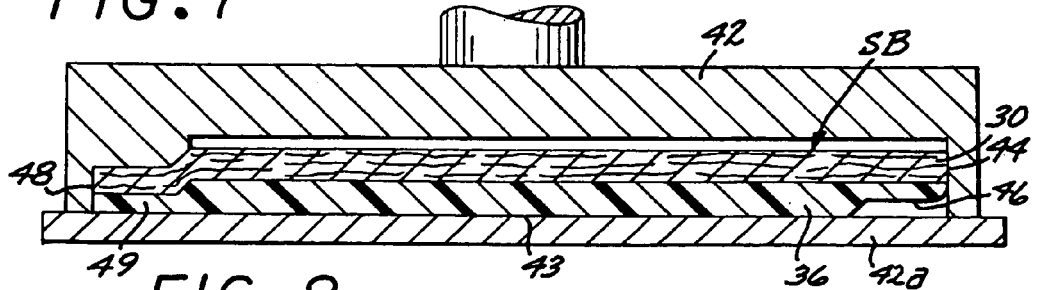
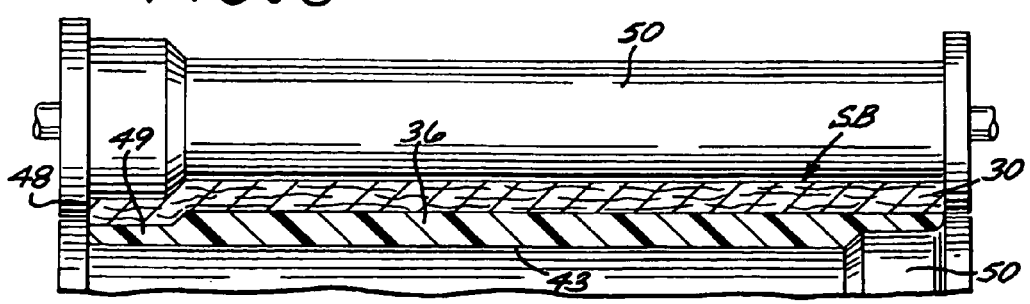

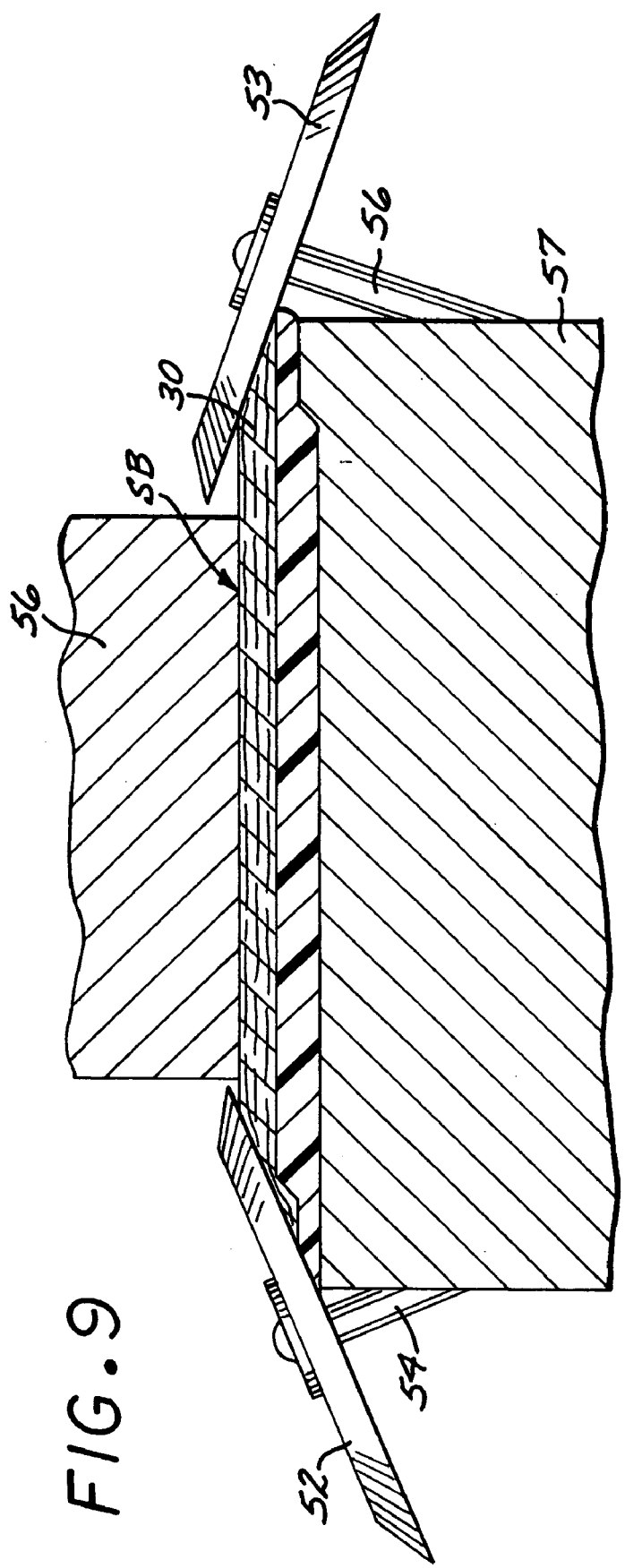
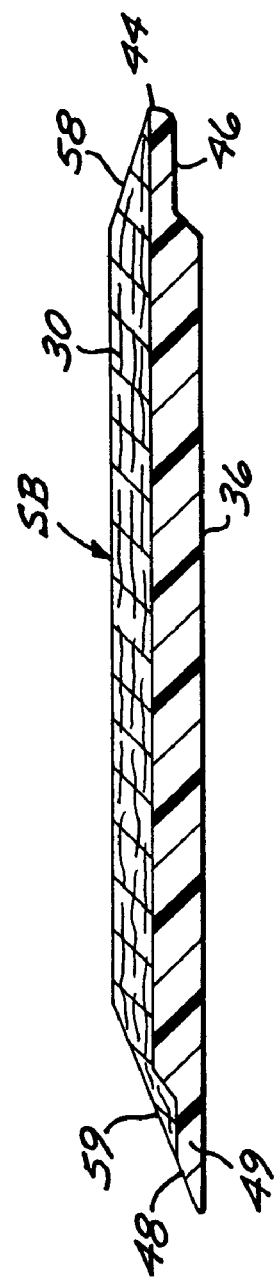

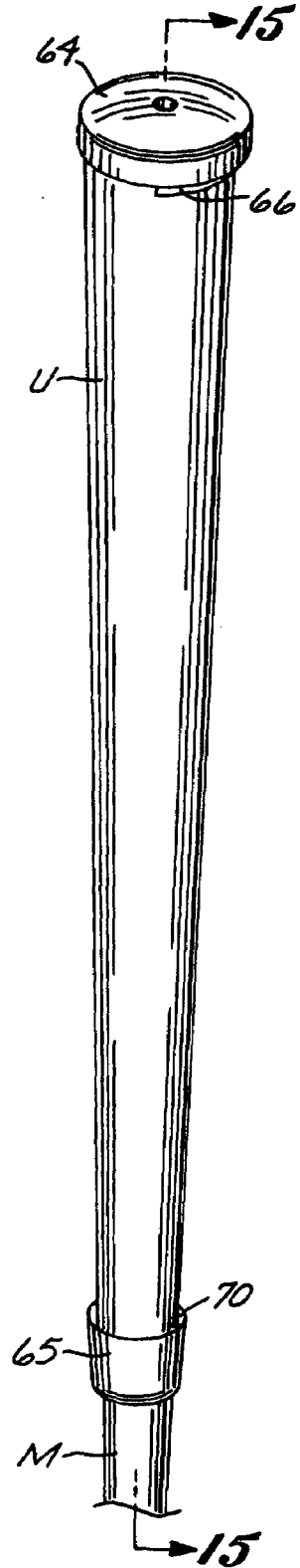
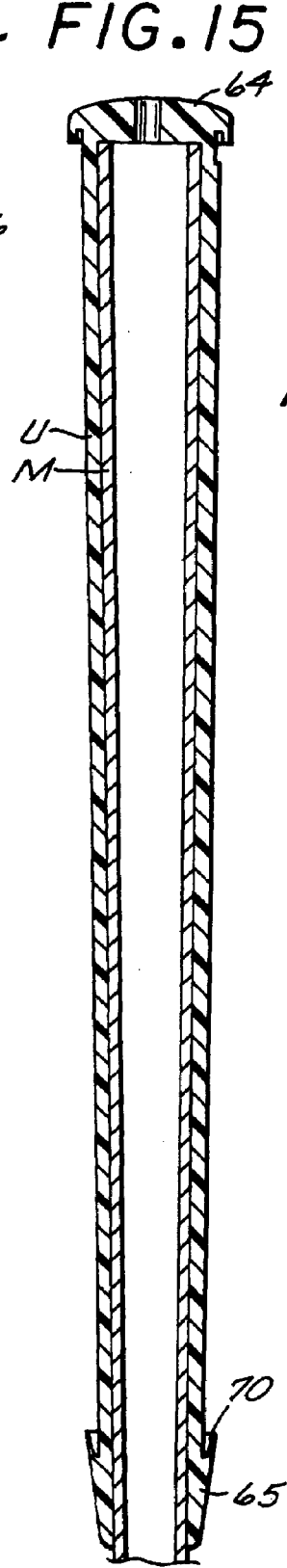
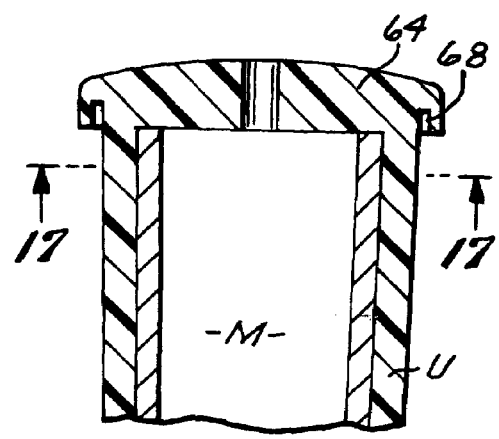
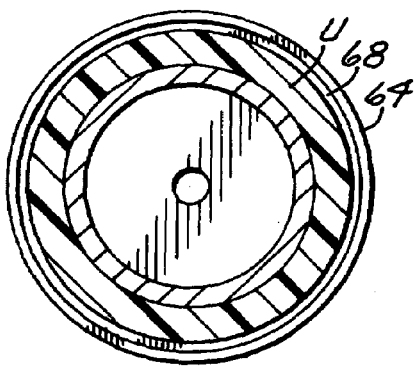

GOLF CLUB HANDLE GRIP

RELATED U.S. APPLICATION DATA

This application is a continuation of U.S. patent application Ser. No. 10/348,389, filed Jan. 21, 2003 now U.S. Pat. No. 6,733,401.

INCORPORATION BY REFERENCE

This application hereby incorporates by reference U.S. patent application Ser. No. 10/348,389, filed Jan. 21, 2003, in its entirety.

BACKGROUND OF THE INVENTION

The present invention relates to a polyurethane-felt golf club handle grip which is tacky and shock absorbing, but has the smooth exterior surface of a conventional rubber grip.

Applicant has previously developed resilient grips which are both tacky and also successfully reduce shock to the muscle and arm joints of the users of golf clubs, tennis racquets, racquet ball racquets, baseball bats and other impact imparting devices. See, for example, U.S. Pat. No. 5,797,813 granted to applicant Aug. 25, 1998. Such earlier golf club grips utilize a polyurethane layer bonded to a felt layer to define a strip which is spirally wrapped around an underlisting sleeve which is adhered to the handle of a golf club or to a bare golf club handle. The sides of the felt layer taper from the side edges of the strip and the polyurethane layer is formed with recessed reinforcement side edges which overlap to form a water retarding joint between the side edges of the strip when the strip is spirally wrapped around the underlisting sleeve or the bare golf club handle.

SUMMARY OF THE INVENTION

While grips such as disclosed in my U.S. Pat. No. 5,797,813 afford superior results as compared to conventional rubber golf club grips, some golfers prefer a grip having the smooth exterior surface of a conventional rubber golf club grip, rather than the interrupted exterior surface resulting from the gaps between the overlapped recessed reinforcement edges of grips such as disclosed in my U.S. Pat. No. 5,797,813.

A preferred form of shock resistant handle grip embodying the present invention includes a strip of bonded-together polyurethane and felt layers which is spirally wrapped about either a resilient underlisting sleeve or the bare handle of a golf club or other impact imparting device, the polyurethane layer being outside the felt layer. The polyurethane layer of the first side edge of the strip is heat compressed to provide a recessed reinforcement edge surface. The polyurethane layer of the second side edge area of the strip is formed with a compressed heat densified area. The felt layer of the first side edge is skived to slant upwardly and outwardly from the underside of the strip. Both the polyurethane and felt layers of the second side edge are skived to slant upwardly and outwardly from the underside of the strip. A conventional double-sided adhesive tape is attached to the underside of the felt layer. To apply the polyurethane-felt strip to the underlisting sleeve of a golf club handle or alternatively to the bare handle of a golf club or the like, the protective strip of the adhesive tape is removed and the strip is spirally wrapped about the underlisting sleeve or bare handle with the second side edge of the strip overlapping the first side edge of the strip along the length of the strip. The resulting juncture between the second and first side edges provides a tight seam between the overlapped side edges along the length of the grip resulting in a smooth exterior surface of the grip which is engaged by a golfer's hands. Such smooth exterior surface resembles the smooth exterior surface of a conventional rubber golf club grip preferred by some golfers. However, the grip of my present invention provides the advantages of polyester-felt grips of the type shown in my U.S. Pat. No. 5,797,813. The grip of my present invention can also provide a long service life, may be manufactured at a low cost, and can be readily installed by a user.

These and other features and advantages of the present invention will become apparent from the following detailed description of a preferred embodiment which, taken in conjunction with the accompanying drawings, illustrates by way of example the principles of the invention.

BRIEF DESCRIPTION OF THE DRAWINGS

FIG. 1 is a top plan view of a strip blank cut from a panel of bonded-together polyurethane and felt layers in accordance with the present invention;

FIG. 2 is a side elevational view showing how the upper surface of such strip blank is provided with a heat embedded friction-enhancing pattern;

FIG. 3 is a top plan view of the strip blank after the friction-enhancing pattern has been formed on the upper surface thereof;

FIG. 4 is a side elevational view taken in enlarged scale along line 4—4 of FIG. 3;

FIG. 5 is a cross-sectional view showing a heat compressed radially inwardly extending reinforcement edge surface being formed on the first side edge of the strip blank by a heated platen;

FIG. 6 is a cross-sectional view similar to FIG. 5, showing the heat compressed inwardly extending reinforcement first side edge being formed by a heated roller;

FIG. 7 is a cross-sectional view showing the formation of a compressed heat densified area on the second side edge of the strip blank by means of a heated platen;

FIG. 8 is a cross-sectional view similar to FIG. 7 showing a heated roller in place of the heated platen of FIG. 7;

FIG. 9 is a cross-sectional view showing the first and second side edges of the strip blank being skived;

FIG. 10 is a vertical sectional view showing the strip blank after the skiving operation;

FIG. 14 is a perspective view of a resilient underlisting sleeve about which the strip of FIG. 11 is spirally wrapped;

FIG. 15 is a vertical sectional view taken along line 15—15 of FIG. 14;

FIG. 16 is a broken enlarged sectional view of the upper portion of the underlisting sleeve;

FIG. 17 is a horizontal sectional view taken along line 17—17 of FIG. 16;

DETAILED DESCRIPTION OF PREFERRED EMBODIMENTS

Figure 26:
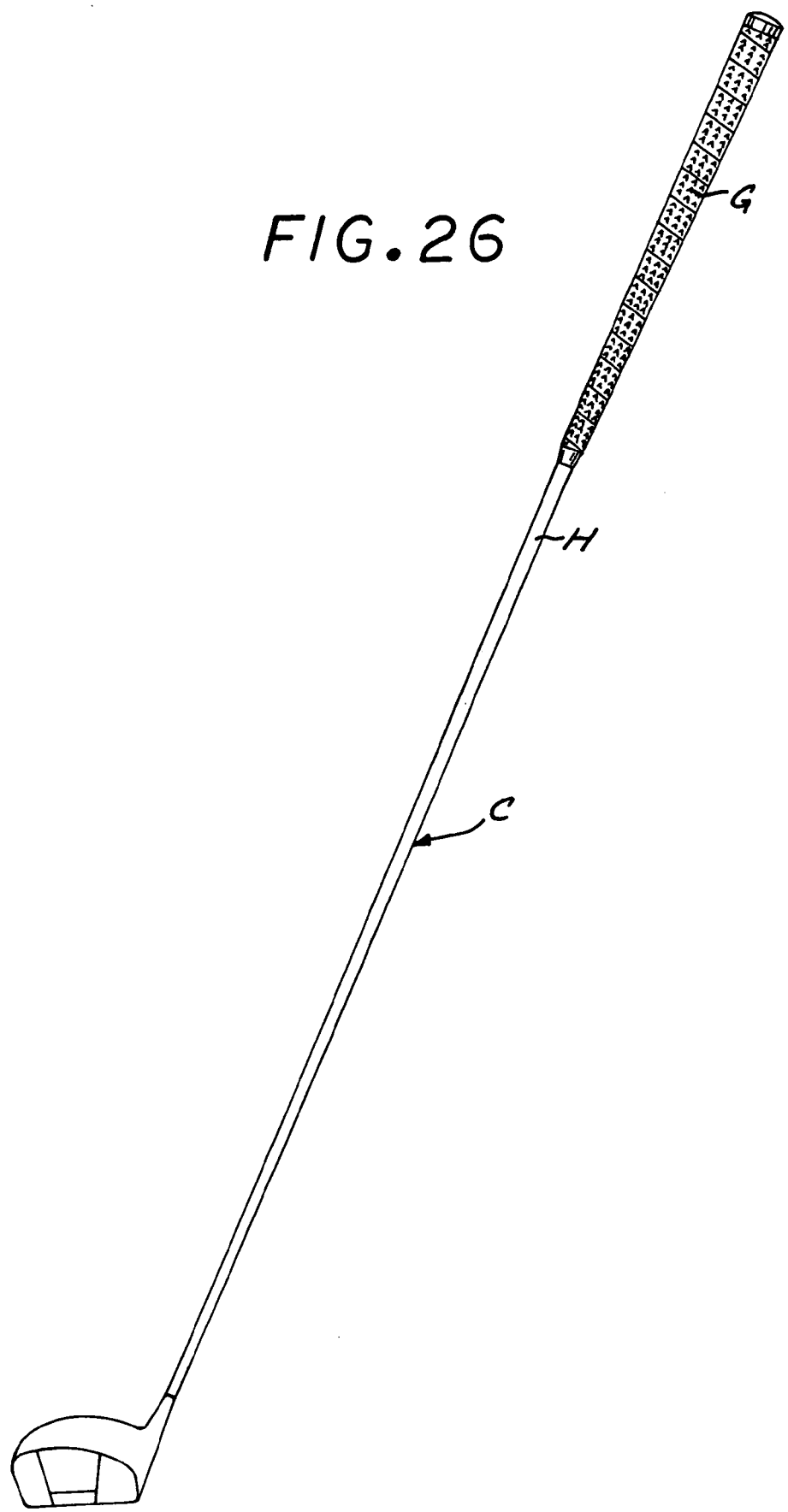
FIG. 26 is a perspective view of a golf club provided with a golf club handle grip of the present invention.

Referring to the drawings, a preferred golf club handle grip G embodying the present invention utilizes an elongated resilient strip S which is spirally wrapped about an underlisting sleeve telescopically overlapping and adhered to the handle of a golf club C or directly to a bare golf club handle (FIG. 26). Strip S is formed from a strip blank SB which includes a felt layer generally designated 30 having an inwardly-facing surface 32 which is provided with an adhesive 34. The felt layer may be made of a material known to those in the art as wool, nylon, polyester or the like. The upper surface of the felt layer 30 is bonded to the lower surface of a polyurethane layer 36 to define the unitary strip blank SB. The polyurethane layer 36 may be formed in a conventional manner, such as described in my U.S. Pat. No. 5,797,813 and is preferably coagulated so as to provide a cushioned grasp of a golfer's hands on a golf club while enhancing the player's grip on the golf club by providing increased tackiness between the player's hand and the grip as compared to a convention rubber golf club grip. The felt layer 30 provides strength to the polyurethane layer 36 and serves as a means for attaching the bonded-together polyurethane and felt strip to a golf club handle underlisting or to a bare handle. The adhesive 34 of the felt layer may be carried by a conventional double-faced tape T, wherein the adhesive is originally covered with a protective paper quick-release cover 38. If desired, the outer (upper) surface of the polyurethane layer of the strip S may be formed with a friction-enhancing pattern 40. Alternatively, other patterns can be formed in the polyurethane layer, such as vertically extending perforations.

More particularly, FIG. 1 is a broken top plan view of a polyurethane-felt strip blank SB which is configured into the strip S. In FIG. 2, a heated die D is shown being urged against the upper surface of the strip blank to form the friction enhancing pattern 40 shown in FIG. 3. FIG. 4 is a vertical cross-sectional view taken in enlarged scale along line 4—4 of FIG. 3 of the strip blank SB. FIG. 5 is a vertical sectional view showing a conventional heated platen 42 being urged against the upper surface 43 of the first side edge 44 of polyurethane layer 36 to form an inwardly extending recessed reinforcement surface 46 along such first edge of the strip blank. The lower surface of the strip blank abuts a base plate 42a. FIG. 6 is a view similar to FIG. 5 wherein the recessed reinforcement surface 46 is formed by means of a pair of conventional heated rollers 47.

In FIG. 7 the strip blank of FIG. 6 has been inverted so the felt layer 30 is disposed above the polyurethane layer 36. The heated platen 42 of FIG. 5 is shown applying heat through the felt layer of the second side edge 48 of the strip blank SB to the polyurethane layer 36 to form a compressed densified area 49 on such second side edge, while the strip blank is supported by base plate 42a having a smooth upper surface. The application of heat to the polyurethane layer in this fashion serves to densify and therefore compress and strengthen the second side edge of the polyurethane layer without creating a marking on the outer (lower) surface of the polyurethane 36. In FIG. 8 heat is shown being applied to the second side edge 48 of the polyurethane layer 36 by means of heated rollers 50. It should he understood that with respect to both FIGS. 7 and 8 the temperature applied to the second side edge 48 of the polyurethane layer, to form the compresses densified area 49, will be higher than the temperature applied to the first side edge 44 of the polyurethane layer in FIGS. 5 and 6 in forming the reinforcement side edge surface 46. By way of example, the temperature employed in the operation of FIGS. 7 and 8 would be approximately 250–260degrees centigrade, while the temperature being applied in the operation of FIG. 6 or 7 would be about 200 degrees centigrade, since the heat must be transferred to the polyurethane layer through the felt layer to form the compressed densified area 49.

Referring now to FIG. 9, after the first and second side edges of the strip blank SB have been heat formed with the recessed reenforcement surface 46 and the compressed densified area 49, the strip blank is inverted and both the first and second side edges are skived to form surfaces which slant upwardly and outwardly with respect to the inner surface (underside) of the felt layer 30. Such skiving may be obtained by means of a pair of conventional power-driven rotary knives 52 and 53. The knives are of like construction and are carried at the upper end of slanted rotatable shafts 54 and 55. During the skiving operation the strip blank SB is compressed between upper and lower powered rollers 56 and 57, respectively. The general appearance of the strip blank after such skiving is shown in FIG. 10. First side edge 44 has a slanted surface 58, while second side edge 48 has a slanted side edge 59. These slanted side edges may be of equal or differing widths. After the side edges of the strip blank have been skived the double-faced tape T may be applied to the underside of the felt layer 30 in a conventional manner.

Figure 11:
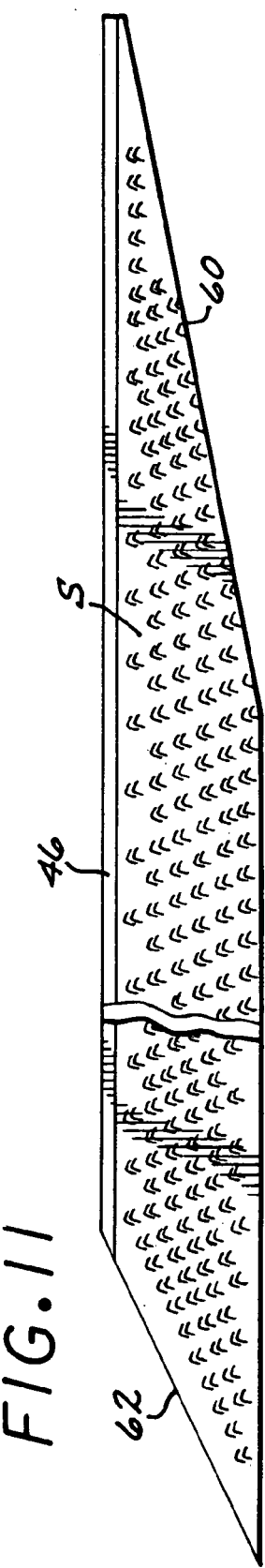
FIG. 11 is a broken top plan view of the strip blank after the tapered leading and trailing edges thereof have been cut-off the ends of the blank.
Figure 12:
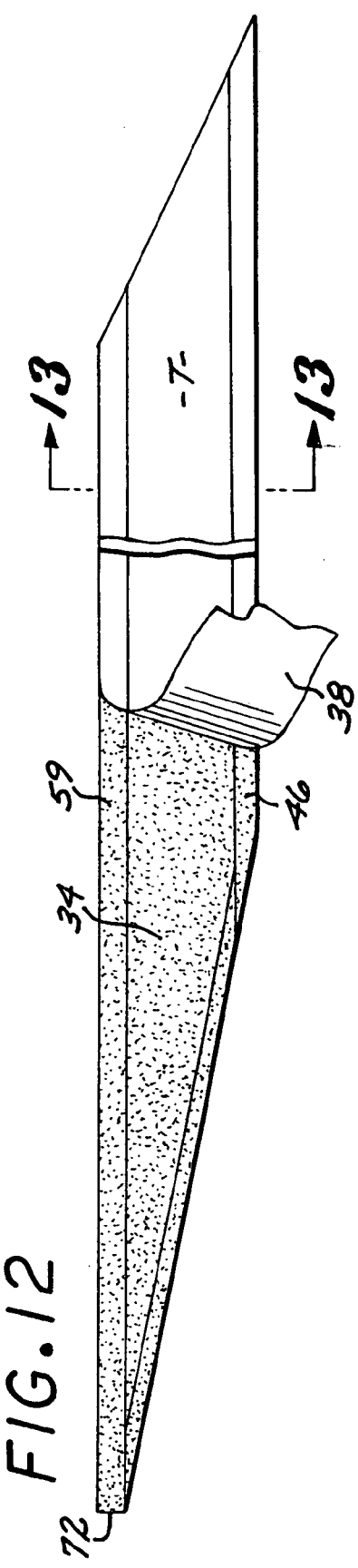
FIG. 12 is top plan view showing the protective strip of the double-faced adhesive tape being peeled-off the adhesive applied to the surface of the felt layer.
Figure 13:
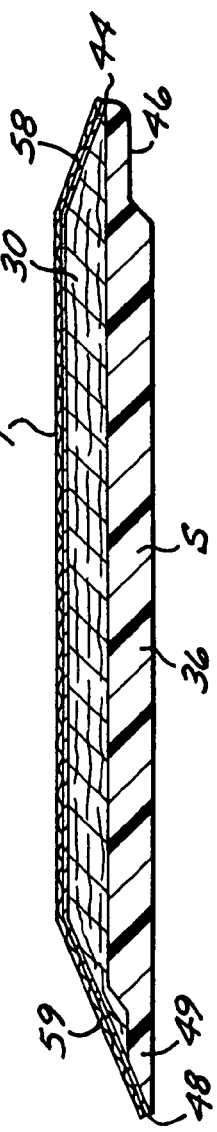
FIG. 13 is a vertical sectional view taken in enlarged scale along line 13—13 of FIG. 12.
Figure 18:
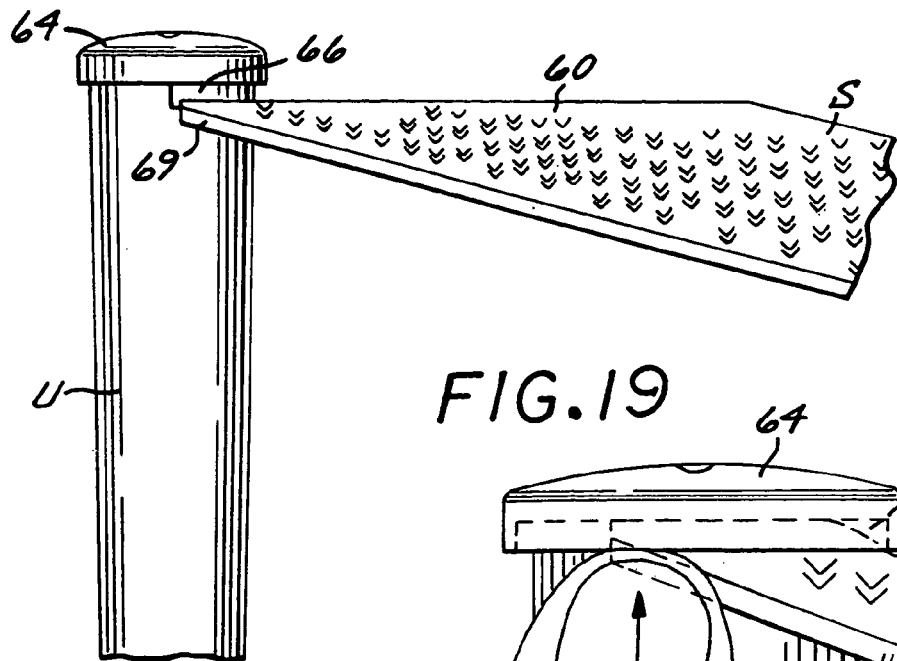
FIGS. 18–20 and 22–24 are side views showing the strip being spirally wrapped around and secured to the underlisting sleeve.

Referring now to FIG. 11, the ends of the strip blank SB are then cut-off to define leading edge 60 and trailing edge 62. The resulting strips are then ready to be spirally wrapped around a resilient underlisting sleeve U shown in FIGS. 14–17. Underlisting sleeve U is formed of a resilient material such as a natural or synthetic rubber or plastic. Sleeve U includes an integral cap 64 at its upper end, while the lower end of the sleeve is formed with an integral nipple 65. The upper portion of the underlisting sleeve is formed with a groove 66 while the underside of cap 64 is formed with a circumferentially extending upwardly extending slot 68. The groove 64 and slot 68 receive the upper or butt end of the resilient strip S in a manner to be described hereinafter. The lower nipple 65 is also formed with an upwardly extending slot 70.

Figure 19:
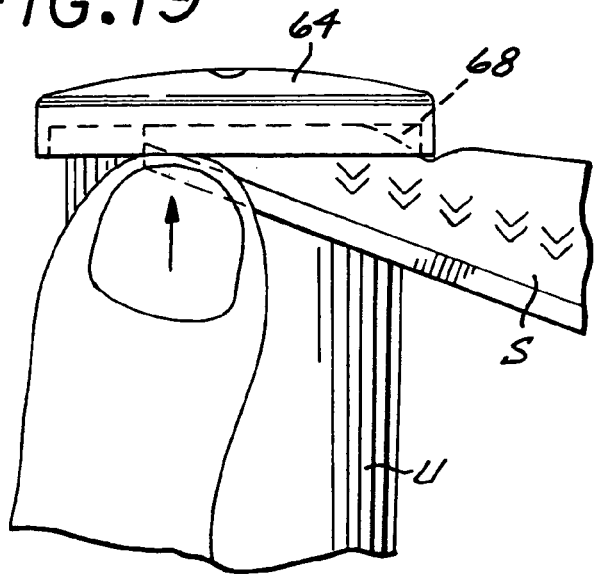
Figure 20:
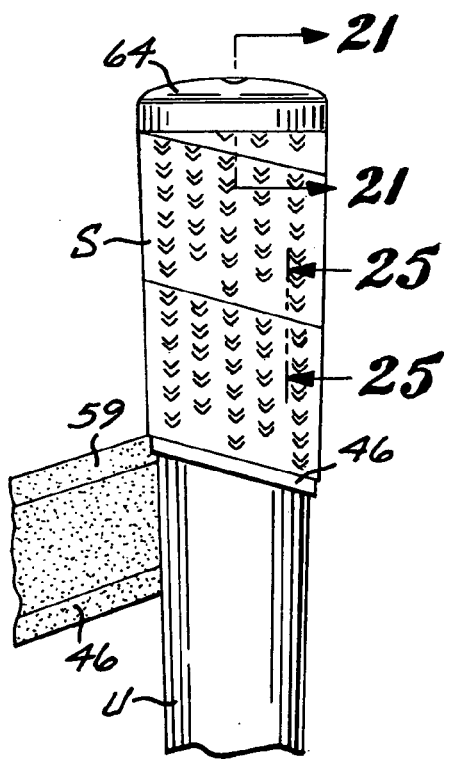
Figure 21:
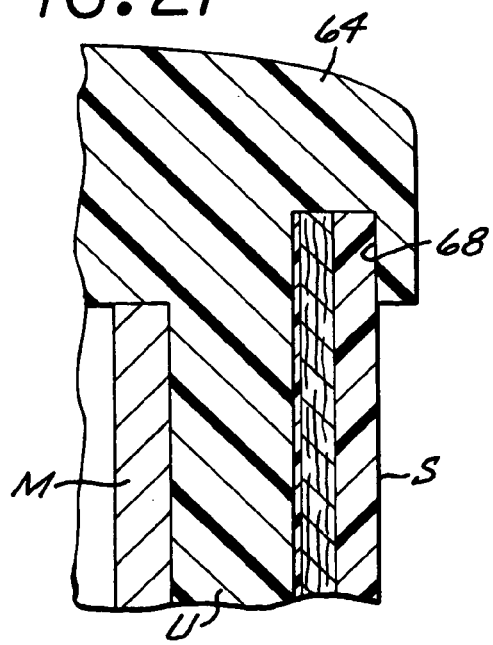
FIG. 21 is a sectional view taken in enlarged scale along line 21—21 of FIG. 20.
Figure 22:
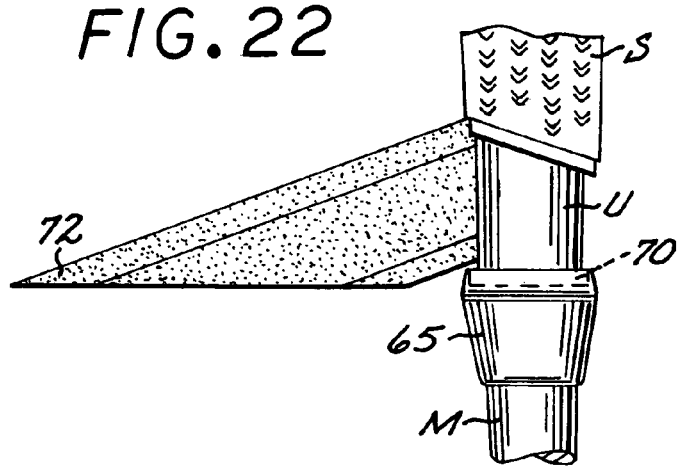
Figure 23:
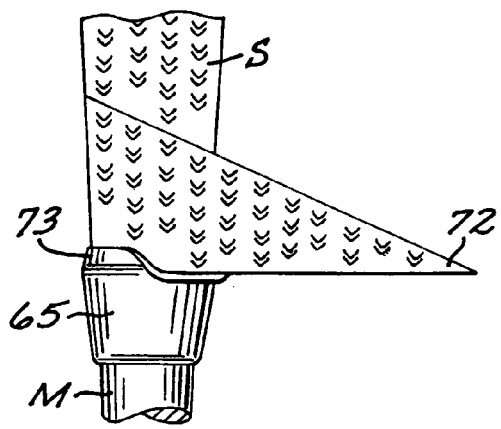
Figure 24:
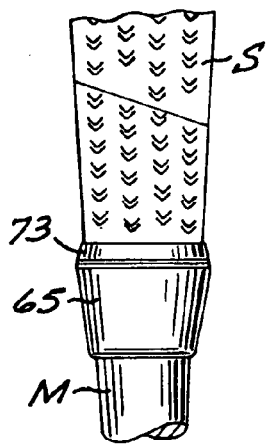

Referring now to FIGS. 12, 18–21, to secure the upper or leading edge 60 of resilient strip S within the circumferential slot 68 of nipple cap 64, the protective cover 38 of tape T is peeled-off adhesive 34. The upper edge of the strip is then manually urged into the confines of the cap slot 68 as shown in FIG. 19. Below the cap 64 the pointed end 69 of leading edge 60 is disposed within the groove 66. The remainder of the strip S is then spirally wrapped downwardly along the outer surface of the underlisting sleeve U. When the strip has been spirally wound to a position wherein its lower or trailing edge 62 is disposed in horizontal alignment with the lower portion of nipple groove 70 the pointed lower end portion 72 of the trailing edge is manually urged into the confines of the groove by temporarily expanding the peripheral lip 73 formed outwardly of the groove so as to admit the lower edge of the strip into the groove. When the lip 73 returns to its original position, the lip will securely retain the lower end of the strip S to the upper portion of the nipple as shown particularly in FIGS. 22–24. With this arrangement, the upper end of strip S is restrained against unraveling by being locked within cap slot 68 while the lower end of such strip is restrained against unraveling by nipple lip 73.

The spiral wrapping of the strip about the underlisting U, may take place when the underlisting sleeve U is positioned upon a mandrel M in a conventional manner. After the strip has been secured upon the underlisting U, the sleeve and strip combination may be removed from the mandrel and be utilized as a grip to be slipped onto the handle portion of a golf club shaft.

Figure 25:
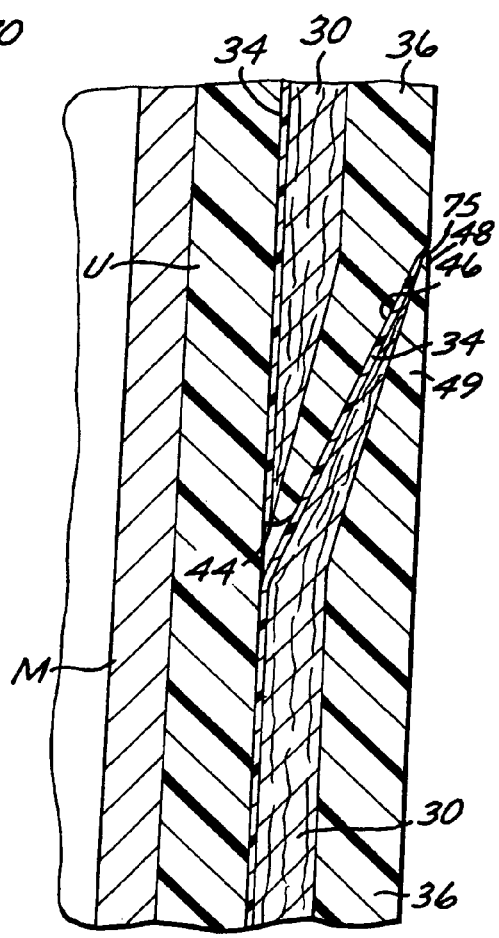
FIG. 25 is a vertical sectional view taken in enlarged scale along line 25—25 of FIG. 20.

Referring now to FIG. 25, in wrapping the strip S around the underlisting sleeve U, the compressed densified area 49 of the second edge 48 of the strip S overlaps the recessed reinforcing surface 46 of the first side edge of the strip. The adhesive 34 is seen to extend for the entire distance of the overlapped side edges, since the upper end of the slanted second side edge 48 tapers radially outwardly and upwardly to a pointed feather edge where the compressed densified area 49 of the side edge 48 abuts the innermost part of the recessed reinforcement surface 46. There is thus provided a thin seam 75 at this juncture. Preferably, the width of this seam will not exceed 0.5 mm, but is preferably less than 0.5 mm. This arrangement provides a smooth exterior surface of the grip G which resembles the feel of the smooth exterior surface of a conventional rubber golf club grip preferred by some golfers. However, the grip of my present invention provides the tackiness and shock absorbing qualities of polyester-felt grips of the type shown in my U.S. Pat. No. 5,797,813. These qualities are not provided by a conventional rubber golf grip.

It should be understood that various modifications and changes may be made with respect to the above description without departing from the scope of the present invention.

I claim:

1. In a grip for the handle of an impact imparting device, a flexible strip comprising:
   a polyurethane layer having its lower surface bonded to the upper surface of a felt layer;
   a recessed reinforcement surface formed on a first side edge of the polyurethane layer;
   the felt layer of the first side edge being slanted upwardly and outwardly from the underside of the felt layer;
   a compressed densified area formed on the second side edge of the polyurethane layer;
   the second side of the strip slanting upwardly and outwardly from the underside of the felt layer; and
   the second side edge of the strip adapted to overlap the first side edge of the strip to form a smooth watertight juncture between such first and second side edges of the strip.

2. A golf club grip as set forth in claim 1 wherein the overlying edges form a seam and the seam does not exceed 0.5 mm in width.

3. A golf club grip as set forth in claim 2 wherein the underlisting sleeve includes a cap and a nipple adapted to retain the strip.

4. A golf club grip as set forth in claim 1 wherein the underlisting sleeve includes a cap and a nipple adapted to retain the strip.

5. A method of making a grip for the handle of an impact imparting device that includes the steps of:
   providing a strip having a layer of polyurethane bonded to a layer of felt;
   heat compressing a first side edge of the polyurethane layer to form a recessed reinforcement surface;
   applying heat through the outside surface of the felt layer to the polyurethane layer at the second side edge of the strip to form a compressed densified area in such polyurethane layer;
   skiving the first side edge of the strip upwardly and outward from the underside of the felt layer; and
   skiving the felt layer of the second side edge of the strip upwardly and outwardly from the underside of the strip.

6. A method of making a golf club handle grip that includes the steps of:
   providing a strip having a layer of polyurethane bonded to a layer of felt;
   heat compressing a first side edge of the polyurethane layer to form a recessed reinforcement surface;
   applying heat through the outside surface of the felt layer to the polyurethane layer at the second side edge of the strip to form a compressed densified area in such polyurethane layer;
   skiving the first side edge of the strip upwardly and outward from the underside of the felt layer;
   skiving the felt layer of the second side edge of the strip upwardly and outwardly from the underside of the strip; and
   providing an underlisting sleeve.

7. The method of claim 6 wherein the underlisting is further provided with a cap and a nipple adapted to retain the strip.

\* \* \* \* \*

UNITED STATES PATENT AND TRADEMARK OFFICE
CERTIFICATE OF CORRECTION

PATENT NO. : 7,195,568 B2
APPLICATION NO. : 10/827095
DATED : March 27, 2007
INVENTOR(S) : Ben Huang It is certified that error appears in the above-identified patent and that said Letters Patent is hereby corrected as shown below:

On Title Page item 56

At page 1, column 2 at line 6, after "1,890,037" delete "12/1932" and insert -- 11/1930 --, therefor.

At page 2, column 2 at line 1, delete "Plaintiffs'" and insert -- Plaintiff's --, therefor.

At page 2, column 2, at line 8, delete "Case." and insert -- Case --, therefor.

At page 2, column 2 at line 25, delete "WINN" and insert -- WINN, --, therefor.

At page 2, column 2 at line 32, delete "Injuction," and insert -- Injunction --, therefor.

At page 2, column 2 at line 43, delete "cites" and insert -- cites: --, therefor.

At page 3, column 1 at line 29, delete "of" and insert -- for --, therefor.

At page 3, column 1 at line 32, delete "Corporations's" and insert -- Corporation's --, therefor.

At page 3, column 2 at line 63, delete "Plaintiffs'Claim" and insert --Plaintiffs' Claim --, therefor.

UNITED STATES PATENT AND TRADEMARK OFFICE
CERTIFICATE OF CORRECTION

PATENT NO.        : 7,195,568 B2
APPLICATION NO.   : 10/827095
DATED             : March 27, 2007
INVENTOR(S)       : Ben Huang It is certified that error appears in the above-identified patent and that said Letters Patent is hereby corrected as shown below:

Column 4 at line 8, delete "250-260degrees" and insert --250-260 degrees --, therefor.

Column 6 at line 4, delete "2 wherein the" and insert -- 1 further comprising an --, therefor.

Column 6 at line 5, delete "includes" and insert -- including --, therefor.

Column 6 at line 7, delete "wherein the" and insert -- further comprising an --, therefor.

Column 6 at line 8, delete "includes" and insert -- including --, therefor.

Signed and Sealed this

Fourth Day of March, 2008

JON W. DUDAS
*Director of the United States Patent and Trademark Office*